Jan. 18, 1966  W. W. LYTH  3,229,706

NO-FLOW RESPONSIVE CONTROL DEVICE

Filed Dec. 1, 1961 2 Sheets-Sheet 1

INVENTOR.
WILLIAM W. LYTH

BY

ATTORNEYS

Jan. 18, 1966 W. W. LYTH 3,229,706
NO-FLOW RESPONSIVE CONTROL DEVICE
Filed Dec. 1, 1961 2 Sheets-Sheet 2

INVENTOR.
WILLIAM W. LYTH
BY
*Ely, Pearne & Gordon*
ATTORNEYS

United States Patent Office 3,229,706
Patented Jan. 18, 1966

3,229,706
NO-FLOW RESPONSIVE CONTROL DEVICE
William W. Lyth, Cleveland, Ohio, assignor to Trabon Engineering Corporation, Solon, Ohio, a corporation of Ohio
Filed Dec. 1, 1961, Ser. No. 156,270
1 Claim. (Cl. 137—102)

This invention relates to a device for sensing the cessation of flow of liquid through a hydraulic system and controlling a valve in response thereto. More particularly, this invention relates to a device for mechanically sensing the cessation of flow of lubricant through a hydraulic system and controlling a valve in response thereto without electrical sensing elements.

In the operation of pipe lines, and particularly in the operation of pipe lines adapted to convey gas or other petroleum products over great distances, it is necessary to provide booster pumping stations at spaced locations along the pipe line to maintain a constant flow of fluid through the line. These pumping stations are provided with pumps driven by suitable internal combustion gas fueled engines, and, since the stations must sometimes be located in remote areas, it is necessary to lubricate the engine by a central lubrication system. In a conventional system the cessation of lubricant flow from a distribution pump would result in bearing damage or complete loss of a pump engine.

Heretofore it has been proposed to provide electrical sensing means responsive to a cessation of lubricant flow to stop the operation of the pump engine. The provision of electrical controls at a pumping station for combustible gases is dangerous and is best avoided because of the risk of fire or explosion. To reduce this risk in another respect, it is desirable to shut off the pump engine by closing its fuel supply line so that combustible mixtures will be substantially exhausted from the engine as it coasts to a stop.

It is an object of this invention, therefore, to provide a mechanical device responsive to the cessation of lubricant flow in a distribution system that will safely shut down a gas fueled pump engine.

It is a further object of this invention to provide a simple yet reliable device for shutting off the fuel supply of a gas fueled pump engine by sensing the cessation of lubricant flow across a peripheral orifice.

It is a further object of this invention to provide a no-flow sensing and control device for sensing the cessation of flow of a liquid between a pair of ports and opening a valve in response to said cessation.

It is a further object of this invention to provide a no-flow sensing and control device for actuating a controlled member upon the cessation of flow of a liquid between a pair of ports.

The foregoing and numerous additional objects, features, and advantages of the invention, and various illustrative constructions will become apparent and more fully understood from the following detailed description of the invention, and from the accompanying drawings, in which.

Figure 1:
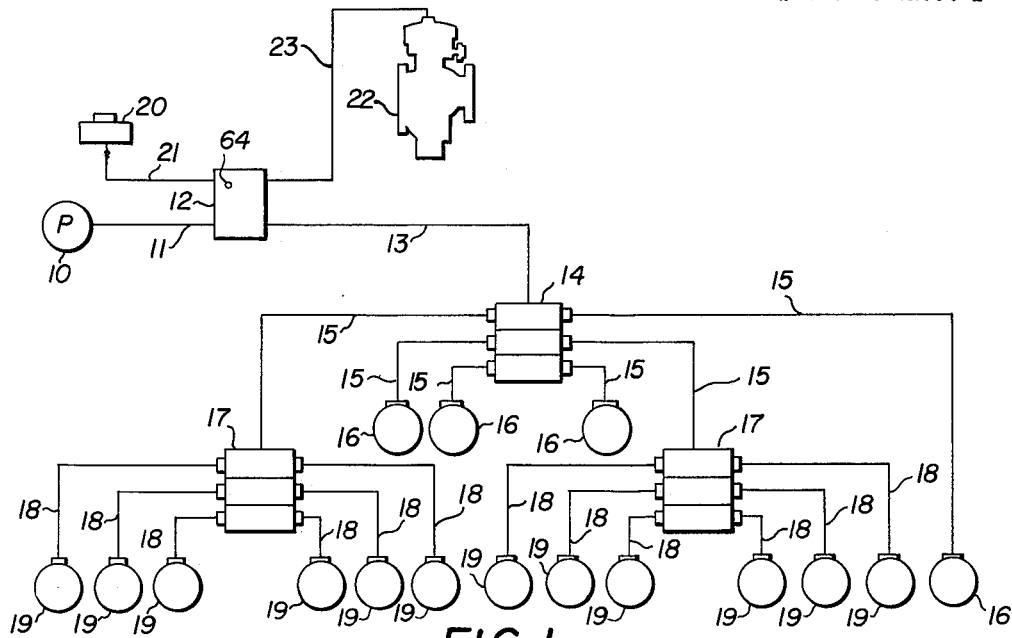
FIGURE 1 is a diagrammatic view showing a no-flow sensing and control device in association with a lubricating system.

Referring now to FIGURE 1, a lubricant supply pump 10 forces lubricant, such as grease or oil, under pressure through a lubricant supply line 11, a no-flow sensing device 12, another lubricant supply line 13, to lubricant distributor 14. The distributor 14 is preferably of the cyclic type set forth for example in U.S. Patents Re. 21,236; 2,718,281; 2,792,911; 2,834,433; and copending application of Robson et al., Serial No. 19,677, filed April 4, 1960 and serves as a hydraulic proportioning and measuring device which will supply periodic and measured quantities of lubricant through the distribution lines 15. The lubricant may be either fed directly to a plurality of engine bearings 16 or to other cyclic type lubricant distributors 17 which, in turn, serve to supply periodic and measured quantities of lubricant through the sub-distribution lines 18 to a plurality of engine bearings 19. It is obvious that the lubricant distribution system shown in FIGURE 1 is exemplary only.

FIGURE 1 also shows a source of pressurized air 20 connected to the no-flow sensing device by an air pressure line 21. A suitable fuel gas safety shut-off and vent valve 22 is connected to the no-flow sensing device by a pilot air pressure line 23.

Figure 2:
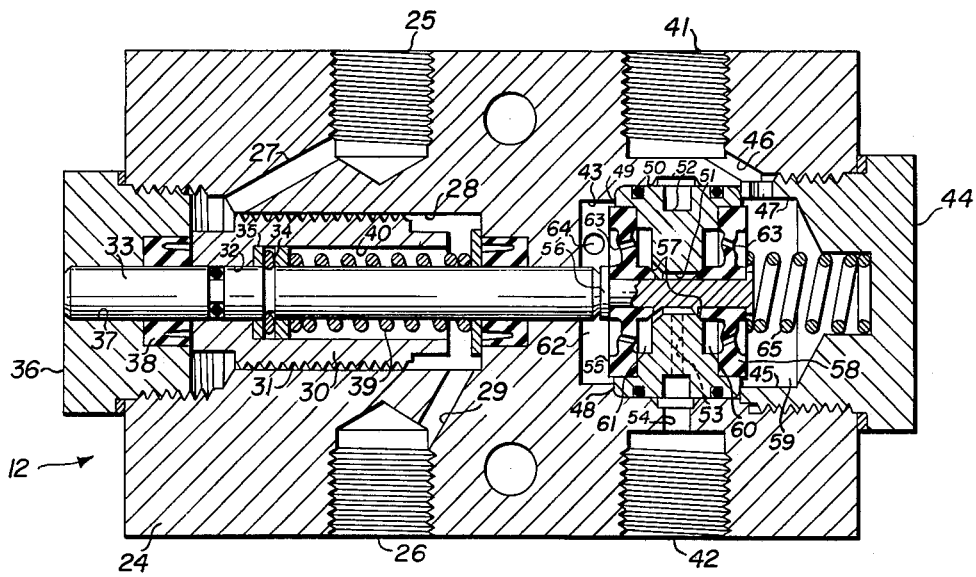
FIGURE 2 is an enlarged longitudinal sectional view of the no-flow sensing device shown schematically in FIGURE 1.

Referring now in detail to FIGURE 2, 12 indicates generally the no-flow sensing device shown schematically in FIGURE 1. The no-flow sensing device 12 comprises a housing 24 having a lubricant inlet port 25 and a lubricant outlet port 26 bored therein at one end. An inlet passageway 27 extends from the inlet port 25 to a cylindrical bore 28 communicating therewith at one end. An outlet passageway 29 extends from the outlet port 26 to the other end of the cylindrical bore 28. A piston 30 is slidably mounted in the bore 28 and is provided on its outer surface with screw threads 31. The screw threads 31 constitute a highly effective and preferred type of peripheral orificing means. As will hereinafter be explained the lubricant must pass through this peripheral orifice on its way from the lubricant pump 10 to the bearings 16 and 19.

In another aspect of the invention, a different type of peripheral orificing may be accomplished by a smooth wall piston slidably received in the cylindrical bore 28. A cylindrical orificing space is provided between the smooth piston and the cylindrical bore by employing a smooth piston having a diameter somewhat smaller than that of bore 28. Lubricant is metered around the periphery of the smooth wall piston and causes a lubricant pressure drop which will hereinafter be explained. By employing a smooth wall piston as a peripherally orificing member, however, many of the advantages inherent in employing a piston having a peripheral spiral passage as a presently preferred peripherally orificing member are lost. Clogging of the orifice by lubricant contaminants can be a far more serious problem in this alternate aspect of the invention.

The piston 30 has a relatively small axial bore 32 in one end thereof which receives a push rod 33. The piston 30 and the push rod 33 centrally located therein form a unitary assembly, locked together by a snap ring 34 and a washer 35 so that movement of the piston 30 in the cylindrical bore 28 will also impart movement to the push rod 33. A piston enclosure cap 36 having an axial bore 37 therethrough is screwed into one end of the housing 24 and serves as an end wall for the cylindrical bore 28. The axial bore 37 slidably receives one end of the push rod 33 and the enclosure cap is provided with a packing member 38 to form an effective fluid seal between the bore 28 and the axial bore 37. The other end of rod 33 slidingly extends through housing 24 and extends into a bore 43. A compression spring 39 is provided in a relatively large axial bore 40 in the piston 30 and serves to bias the piston 30 and the push rod 33 in the position shown in FIG. 2.

A second pair of fluid access ports 41 and 42 is provided in the housing 24. The port 41, in the embodiment shown in the drawings, is adapted to be connected to the pressure line 21 which, in turn, is connected to the pressurized air source 20 as is shown in FIG. 1. The port 42 is adapted to be connected to the pressure line 23 which, in turn, is connected to the shut-off and vent valve 22.

The bore 43, axially aligned with the cylindrical bore 28, is provided in the other end of the housing 24 and is sealed by threaded enclosure cap 44 having a recess 45 on its inward end. A passageway 46 extends from the port 41 through the housing 24 and the enclosure cap 44 to a chamber 47 defined by the bore 43 and the enclosure cap 44. A three-way air valve 48 is rigidly held in the bore 43 between a shoulder 49 and the enclosure cap 44. The air valve 48 comprises a spool-shaped body member 50 having an axial bore 51 therethrough and an annular groove 52 therein. A passageway 53 is provided between the bore 51 and the annular groove 52, and a passageway 54 extends between the groove 52 and the port 42. A flexible diaphragm 55 is peripherally secured to the inward end of body member 50 and axially supports a response rod 56 at one end thereof. A similar flexible diaphragm 58 is peripherally secured to the outward end of the body member 50 and axially supports the other end of the response rod 56. Sufficient clearance is provided between the response rod 56 and the bore 51 to define a fluid passageway. Either end of the bore 51 is flared to receive and provide valve seats for a pair of conical valve projections 57 of the flexible diaphragms 55 and 58 when axial motion is imparted to response rod 56.

The body member 50 and peripherally secured diaphragms 55 and 58 serve to divide the chamber 47 into four sub-chambers 59, 60, 61, and 62. A plurality of passageways 63 are provided in the diaphragm 58 connecting the chambers 59 and 60 and, similarly, in the diaphragm 55 connecting the chambers 61 and 62. The sub-chamber 62 is provided with a vent 64 extending through the housing 24.

A compression spring 65 is provided in sub-chamber 59 and serves to bias the response rod 56 and seat the conical projection 57 of the flexible diaphragm 58 in the position shown in FIGURE 2.

Figure 3:
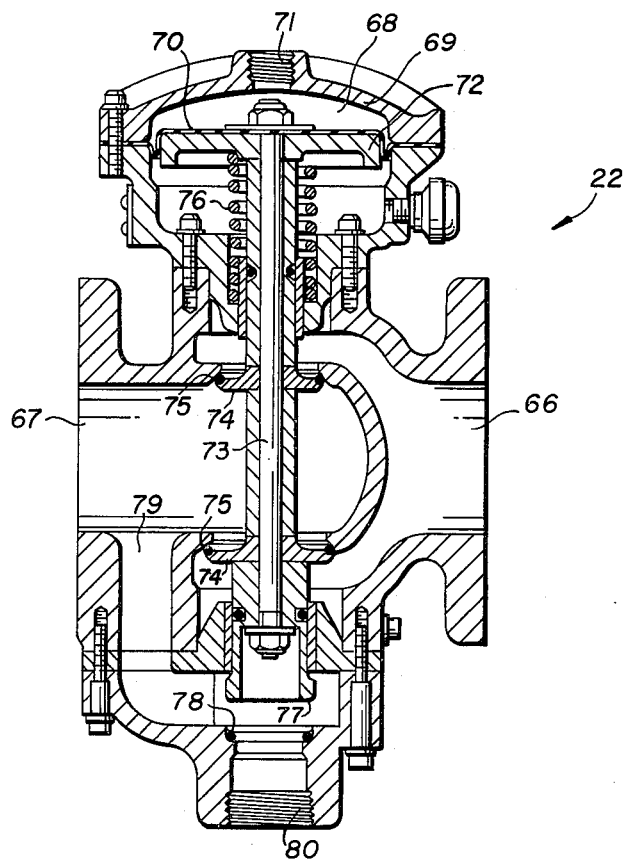
FIGURE 3 is a longitudinal sectional view of a suitable fuel gas safety shut-off and vent valve responsive to the no-flow sensing device shown schematically in FIGURE 1.

Referring now to FIGURE 3, 22 indicates generally a fuel gas safety shut-off valve. The shut-off valve 22 has an inlet aperture 66 and an outlet aperture 67 which are adapted to be connected in a fuel gas line (not shown) for an internal combustion engine (not shown). A chamber 68 defined by a cap 69 and a flexible sealing diaphragm 70 has a threaded pilot air aperture 71 adapted to be affixed to the pilot air pressure line 23, as is shown in FIG. 1. A backing member 72 is affixed to the diaphragm 70 and has a depending valve stem 73 affixed thereto. The valve stem 73 carries a pair of main valve members 74 which are adapted to seal a pair of main valve seats 75. A compression spring 76 urges the valve stem 73 in an upward direction and the main valve members 74 in a closed position as is shown in FIG. 3. An exhaust vent valve 77 is carried by the lower end of the valve stem 73 and is adapted to seal a vent valve seat 78. An exhaust passage 79 is provided between the outlet aperture 67 and a vent port 80.

In the position shown in FIG. 3, the main valve members 74 are in a closed position preventing fuel flow between the inlet aperture 66 and the outlet aperture 67. Also, in the position shown in FIG. 3, exhaust vent valve 77 is in an open position permitting the fuel line extending from the shut-off valve 22 to the gas transmission pump engine to vent through the exhaust passage 79 and the vent port 80 to the outside atmosphere. As will hereinafter be explained, during the normal operation of the pump engine, sufficient pilot air pressure will exist in the chamber 68 to resist the force of the spring 76 to completely open the valve member 74 and completely close the exhaust vent valve 77, thus permitting fuel flow through the inlet aperture 66 and the outlet aperture 67 while preventing exhaust flow through the vent port 80.

In normal operation, the bearings of a pump engine are supplied with lubricant by a lubricant pump. The lubricant passes through the line 11 and into the no-flow sensing device 12 through inlet port 25 and the passageway 27. The lubricant flows through the cylindrical bore 28 by following a peripheral orifice which may be either the highly desired and preferred tortuous path defined by the screw threads 31 on the piston 30 or the smooth cylindical path as was noted above. This causes a pressure drop in the lubricant and a resultant force sufficient to overcome the bias of the spring 39 and, since the piston 30 is area balanced, both the piston 30 and the push rod 38 joined thereto will move to the right in the direction of lubricant flow. The force resulting from this pressure drop is also sufficient to overcome the bias of the spring 65 by the action of the push rod 33 on the response rod 56 and move the response rod 56 to the right. This action will serve to open the valve 57 on the diaphragm 58 and to close the valve 57 on the diaphragm 55. With the diaphragm valves in this position, air pressure, produced by the air source 20, exists in the line 21, the port 41, the passageway 46, the subchambers 59 and 60, the axial bore 51, the passageway 53, the annular groove 52, the passageway 54, the port 42, the line 23, and the chambers 68 of the shut-off valve. The air pressure in this system is sufficient to overcome the bias of the spring 76, open the valves 74 and, consequently, close the valve 77. With the valves 74 in this position, fuel is permitted to flow to the pump engine through the inlet aperture 66 and the outlet aperture 67. It is obvious, therefore, that as long as there is a flow of lubricant to the pump engine bearings 16 and 19, through the no-flow device, fuel will be permitted to flow to the pump engine.

If lubricant ceases to flow to the pump engine bearings and through the no-flow sensing device, the device will assume the position shown in FIG. 2. Since a pressure drop does not occur across the peripherally orificing member, the pressure exerted by the springs 39 and 65 will be unopposed and the rods 33 and 56 will shift to the left. Valve 57 of flexible diaphragm 55 will open and valve 57 of flexible diaphragm 58 will close, thus permitting air pressure in chamber 68 to exhaust through line 23 and vent 64 to the outside atmosphere. With only atmospheric pressure existing in the chamber 68, the spring 76 will close the valves 74 and open the valve 77 as is shown in FIG. 3. The fuel remaining in the fuel line leading from the safety shut-off valve to the pump engine will be exhausted to the outside atmosphere through passageway 79. This venting feature also eliminates the possibilty of fuel entering the pump engine by way of leakage past the main valves 74 during the shutdown period.

The pneumatics of the above-described system or similar systems may be such that the port 41 may be permanently plugged and pressurized air may be introduced into the system from the source 20 through a line that leads directly into and is connected with line 23 rather than the port 41. This is feasible in the illustrated system when venting of the line 23 will in itself assure a sufficient pressure drop within the chamber 68 to cause the shut-off valve 22 to move to the position shown in FIGURE 3, without any necessity for additionally positively interrupting the connection between the pressure source and the line 23.

The form of the invention described herein is intended to be illustrative and the invention should not be considered as limited except as defined in the following claim.

What is claimed is:

A no-flow sensing and control device for sensing the cessation of flow of a liquid between a pair of ports and opening a valve in response to said cessation, comprising means defining a first pair of ports and fluid passage means between said first pair of ports, said fluid passage means including a cylindrical bore having a fluid input end and a fluid output end, a cylinder slidingly received in said bore defining a peripheral orifice with said bore for reciprocating movement between a first position toward said input end and a second position toward said output end whereby fluid passing from said input end to said output end must pass through said orifice, means defining a second pair of ports and air passage means defining a chamber between said second pair of ports, means defining a vent passage from said air passage to the outside atmosphere, a three-way valve disposed in said air passage, linkage means between said cylinder and said valve and moving said valve to a position opening one of said second pair of ports to the outside atmosphere through said air and vent passages while closing the other one of said second pair of ports when said cylinder is in said first position and to a position closing said vent when said cylinder is in said second position, and biasing means urging said cylinder toward said first position.

References Cited by the Examiner
UNITED STATES PATENTS

| | | | |
|---|---|---|---|
| 16,848 | 3/1857 | McHenry | 138—42 |
| 891,377 | 6/1908 | Samuelson | 138—43 XR |
| 1,339,798 | 5/1920 | Thompson | 184—6 XR |
| 1,473,303 | 11/1923 | Lightford | 123—196 |
| 1,619,444 | 3/1927 | Taylor | 138—42 |
| 1,879,197 | 9/1932 | Greenwald | 138—43 |
| 2,013,316 | 9/1935 | McLean | 138—42 XR |
| 2,284,910 | 6/1942 | Long | 137—94 |
| 2,291,243 | 7/1942 | Levy | 92—162 |
| 2,371,720 | 3/1945 | Stine | 137—87 XR |
| 2,392,030 | 1/1946 | Davis | 137—504 |
| 2,752,933 | 7/1956 | Olson | 137—87 |
| 2,833,602 | 5/1958 | Bayer | 92—162 XR |
| 2,842,150 | 7/1958 | Olson | 137—87 |
| 3,042,072 | 7/1962 | Humphrey | 137—454.6 |
| 3,043,324 | 7/1962 | Morgan | 137—94 |

FOREIGN PATENTS

| | | |
|---|---|---|
| 882,482 | 3/1943 | France. |
| 1,056,657 | 10/1953 | France. |
| 1,216,686 | 4/1960 | France. |
| 409,391 | 5/1934 | Great Britain. |

ISADOR WEIL, *Primary Examiner.*

M. CARY NELSON, WILLIAM F. O'DEA, *Examiners.*